United States Patent [19]
Heminger

[11] Patent Number: 5,733,083
[45] Date of Patent: Mar. 31, 1998

[54] ADHESIVE INSERT ANCHOR

[75] Inventor: David V. Heminger, Tulsa, Okla.

[73] Assignee: United Industries Corporation, Tulsa, Okla.

[21] Appl. No.: 717,528

[22] Filed: Sep. 17, 1996

Related U.S. Application Data

[60] Provisional application No. 60/003,925 Sep. 18, 1995.

[51] Int. Cl.$^6$ .............................. F16B 39/00; F16B 39/02
[52] U.S. Cl. .............................. 411/82; 411/258; 411/930; 405/259.6
[58] Field of Search .............................. 411/82, 258, 930; 405/259.1, 259.5, 259.6

[56] References Cited

U.S. PATENT DOCUMENTS

| | | | |
|---|---|---|---|
| 4,430,025 | 2/1984 | Giavatta | 405/259.1 X |
| 4,993,900 | 2/1991 | Hugel et al. | 411/82 |
| 5,483,781 | 1/1996 | Ernst et al. | 411/82 X |
| 5,562,377 | 10/1996 | Gannuzzi et al. | 411/258 X |

*Primary Examiner*—Neill R. Wilson
*Attorney, Agent, or Firm*—Scott R. Zingerman; Frank J. Catalano

[57] ABSTRACT

An adhesive insert anchor including an anchor body and a screw member for insertion into a drilled hole in a substrate containing an adhesive. The anchor body further including an integral friction segment and an adhesion segment. The friction segment includes an internally threaded cavity in which to receive the screw member and a knurled portion. The adhesion segment includes a cylindrical section and a plurality of saucer-shaped buttons positioned along its length ending with a terminal button. The buttons on the adhesion segment provide greater surface area for contact between the adhesive and the anchor. The friction segment has an external diameter substantially the same as the diameter of the hole drilled in the substrate, thereby providing a friction fit between the anchor body and the walls of the substrate hole. The external diameter of the adhesion segment is smaller than the external diameter of the friction segment so that when the anchor body is inserted into the hole in the substrate, there is space between the adhesion segment and the walls of the hole which is completely filled by adhesive so as to securely bond the anchor body with the substrate. The friction fit of the friction segment maintains the adhesion segment of the anchor body a proper distance from the bottom of the substrate hole and provides for light-duty loading of the anchor while the adhesive cures.

24 Claims, 10 Drawing Sheets

ADHESIVE INSERT ANCHOR

This application claims the benefit of the following:
U.S. Provisional Application No. 60/003,925, filed Sep. 18, 1995.

BACKGROUND OF THE INVENTION

1. Field of the Invention

The present invention relates to the combination of a mechanical anchor disposed in a hole in a substrate and an adhesive to bond the anchor to the substrate.

2. Description of the Prior Art

The use of mechanical anchors disposed in a substrate and adhesives used to bond the anchor to the substrate are known in the art. These anchors are generally cylindrical in shape and include some type of means for securing an object to the substrate. Typically, a hole is drilled in the substrate, cleaned, and an amount of adhesive, such as epoxy, is inserted into the hole. The anchor is then inserted into the hole in contact with the adhesive, and the adhesive allowed to cure prior to placing the anchor under a load. The holding values of the anchors of the prior art are derived from the bond of the adhesive between the anchor and the substrate. This requires that the adhesive be allowed to cure prior to placing the anchor under a load. In addition, when the anchors of the prior art are installed, the adhesive has the potential of being displaced by the anchor and leaking around its external diameter which must be wiped away prior to loading. This may be an added problem if the anchor is configured with an internal cavity capable of receiving a threaded member. The internal cavity may become filled with adhesive, thereby preventing proper installation of the threaded member. A further problem with prior art designs is that the anchor is of a smaller diameter than the hole in the substrate and difficult to maintain in axial alignment with the hole. Difficulty is also encountered when attempting to install the anchor at a predetermined depth. Attempts at overcoming this problem include additional apparatus which require added skill in installation and additional cost to the anchor.

Anchors using adhesive such as epoxy alone to retain them in the substrate experience a phenomena known as "long term creep" when subject to elevated temperatures and/or long term loading conditions wherein the epoxy turns into a gel-like state and the anchor is pulled out of the hole very slowly over time.

A problem often encountered in the industry when epoxy adhesive is used is the presence of voids when the epoxy is dispensed into the hole. These voids often remain when the epoxy cures and reduces the holding value of the anchor.

Another problem is the potential failure of the components of the epoxy (typically two, an epoxy and an activator) to mix completely before being dispensed into the hole. An attempt to solve the mixing problem is the addition of static mixing attachments to the epoxy tubes without any modification to the anchor itself. Such solutions have not been completely successful.

It is also known in the industry that if the epoxy cures with a high cross-link density, the epoxy will provide a stronger bond, and the holding values for the anchoring system will be significantly higher. No current anchoring systems provide for the application of pressure to the epoxy during the curing period which is understood to increase the cross-link density of the final polymer.

A need, therefore, exists for an adhesive insert anchor which minimizes the voids in the epoxy dispensed into the substrate hole.

Another need exists for an adhesive insert anchor which promotes additional mixing of the epoxy components in the hole during the installation process.

A need exists for an adhesive insert anchor which allows the epoxy to cure under pressure in the hole, producing improved holding values.

A need exists for an adhesive insert anchor having coactive holding capabilities producing significant holding values.

Additionally, a need exists for an adhesive insert anchor including an anchor body capable of being set to a predetermined depth.

A need also exists for an adhesive insert anchor which includes means for providing interim loading while the adhesive cures.

A further need exists for an adhesive insert anchor including means to prevent the leakage of adhesive around the anchor body during installation.

SUMMARY OF THE INVENTION

This invention is a novel adhesive insert, drop-in, anchor providing effective adhesion of the anchor to the substrate through the use of an adhesive material. The novel anchor is comprised of an anchor body and a screw member. The anchor body includes an internally threaded cavity in which to receive the screw member. The anchor body is a unitary piece defined by an upper friction segment and a lower adhesion segment. The external diameter of the friction segment is greater than the external diameter of the adhesion segment. The length and diameter of the anchor body, and thereby the depth and diameter of the hole in the substrate, as well as the length and diameter of the screw member, may be varied, depending upon the desired application, holding value required, concrete variability, and thickness of the object being anchored.

The adhesion segment of the anchor body is a unitary piece of material defined by a series of buttons. Each button is saucer shaped with a rounded contour facing the terminal end of the anchor body and a flat shelf facing the friction segment. The rounded contour facilitates the flow of adhesive around the buttons and up the length of the adhesion segment to ensure complete immersion of the adhesion segment in adhesive. The flat shelf resists the anchor body from being pulled out of the hole, once the adhesive has cured.

The adhesion segment is substantially cylindrical between the buttons and is knurled to increase the surface area in contact with the adhesive. The number of buttons used on the adhesion segment depends upon the length of the anchor.

The friction segment has an external diameter substantially the same as the diameter of the hole drilled in the substrate into which the anchor body is inserted. The terminal end of the adhesion segment is inserted first. The friction segment provides a friction fit between the anchor body and the walls of the substrate hole. The external diameter of the adhesion segment is smaller than the external diameter of the friction segment so that when the anchor body is inserted into the hole in the substrate, there is a space between the anchor and the walls of the hole which is completely filled by adhesive so as to securely bond the anchor body with the substrate. The external diameter of the friction segment includes a knurled portion in order to increase the friction fit between the anchor body and the walls of the substrate hole. The knurled portion also resists rotation of the anchor body within the substrate hole because upon insertion of the anchor body, the knurls scar the inside of the substrate hole.

Installation of the adhesive insert anchor of the present invention begins with drilling a hole in the substrate, such as concrete, masonry, rock, or the like, to a predetermined depth. The hole is then cleaned using compressed air and a brush. After cleaning, a generous amount of adhesive is inserted in the bottom of the hole. The anchor body is then twisted into the hole in order to agitate the adhesive in order to eliminate voids, thoroughly mix the components of the adhesive, and dislodge substrate (concrete) dust from the walls of the hole allowing the adhesive to attack the porosity of the substrate. The anchor body is twisted into the hole until the friction segment reaches the top of the concrete, the anchor body is then driven into the hole so that the adhesion segment displaces the adhesive entirely around the adhesion segment.

The friction fit of the friction segment with the walls of the hole prohibit the escape of adhesive around the anchor body which might otherwise fill the internally threaded cavity. The friction fit also places the adhesive under pressure which compresses voids and increases cross-link density in the cured adhesive. It also forces the adhesive into the porous substrate, most commonly concrete, thereby obtaining a stronger adhesive/substrate bond.

The friction fit of the friction segment maintains the adhesion segment of the anchor body a predetermined distance from the bottom of the substrate hole so that a substantial amount of adhesive fills that space. Secondly, the friction fit of the friction segment holds the anchor body in place during the curing time of the adhesive. Thirdly, the friction fit provides for light-duty loading of the anchor while the adhesive cures. In this way, a time saving feature is provided so that the screw member may be threaded into the internally threaded cavity while the adhesive is curing, and the anchor may provide light-duty loading in order to anchor an object during the curing time of the adhesive. Lastly, the friction fit retains the anchor body in the substrate in order to minimize or eliminate the problem of "long term creep" of the anchor body out of the adhesive.

The adhesive insert anchor of the present invention as described above provides independent coactive holding capabilities provided by the friction fit and the cured adhesive.

The screw member may be provided with a spacer in order to account for the thickness of the object being anchored. The screw member is removably threaded into the internally threaded cavity so that the object being anchored can be removed or replaced as desired. The screw member may be configured in many different ways such as a bolt, eyelet, or may be integral with the anchor body such as a threaded bolt or a permanent hold-down.

The adhesive insert anchor may be fitted with a sleeve so as to be used for overhead applications. The sleeve covers the adhesion segment and has an internal diameter so as to frictionally engage the friction segment. When secured to the friction segment, the sleeve acts as a cup into which adhesive is dispensed so as to fill the sleeve. Once the hole is prepared, the sleeve is placed over it and the friction segment twisted so as to push it into the sleeve. This forces the adhesion segment and the adhesive into the hole. Once the friction segment frictionally engages the hole, the anchor body is then driven into the hole. A mess free adhesive insert anchor is thereby provided for overhead use.

Alternate embodiments include offsetting the longitudinal axis of a length of the friction segment from the longitudinal axis of the anchor body so as to receive an eccentric ring. The eccentric ring acts as a wedge or cam against the walls of the substrate hole, thereby providing additional holding value.

Another alternate embodiment may include a larger terminal button than the other terminal button into which channels are cut. The channels facilitate the flow of adhesive around the adhesion segment of the anchor body.

A further alternate embodiment includes replacement of the buttons on the adhesion segment of the anchor body with a cylindrical section and a series of frustums positioned truncated end to base ending at the terminal end of the anchor body. The last frustum of the anchor body, whose truncated end defines the terminal end of the anchor body, is shorter in length than the other frustums and is designed to resist the occurrence of stress risers in the adhesive surrounding the adhesion segment. The series of frustums on the adhesion segment provide greater surface area for contact between the epoxy and the anchor in order to achieve greater holding values for the anchor when it is placed under load.

Another alternate embodiment includes replacing the buttons of the adhesion segment with annular rounded ridges terminating with a rounded terminal end. The rounded terminal end and the annular rounded ridges having increasing external diameters from the annular rounded ridge closest to the friction segment with the greatest external diameter being the rounded terminal end so as to facilitate the movement of displaced adhesive around the adhesion segment. The annular rounded ridges provide greater resistance to stress risers in the cured adhesive.

An object of the invention is to provide an adhesive insert anchor that minimizes voids in the adhesive and increases cross-linking density of the epoxy adhesive cured under pressure created and maintained by the friction fit of the friction segment.

Another object of the invention is to provide an adhesive insert anchor that is easy to install, achieves excellent holding values, resists vibration, resists environmental conditions, and may include a removable screw member to provide for fastening, removal, and then refastening.

It is a further object of this invention to provide an anchor with coactive holding potential derived both from the adhesive bond between the anchor body and the substrate and from the friction fit of the friction segment with the walls of the substrate.

An additional object of this invention is to provide an adhesive insert anchor which provides interim loading potential derived from the friction fit of the friction segment with the walls of the substrate while the adhesive cures.

A still further object of the invention is to provide an adhesive insert anchor that allows the anchor body to be maintained at a proper predetermined depth in the substrate hole during cure of the adhesive.

A yet further object of the invention is to provide an adhesive insert anchor having an adhesive segment including a substantial surface area to contact with the adhesive, yet configured so as to resist the occurrence of stress risers in the cured adhesive.

DETAILED DESCRIPTION OF THE PREFERRED EMBODIMENT

Figure 1:
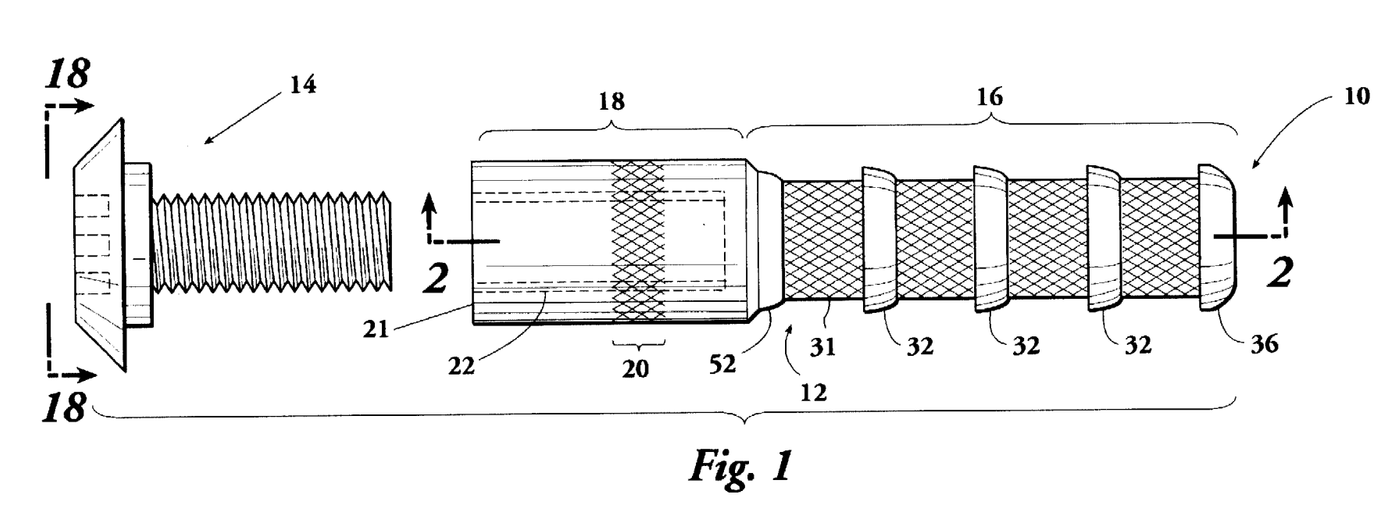
FIG. 1 is a side view of the adhesive insert anchor of the present invention.

Attention is directed to FIG. 1 which shows the adhesive insert concrete anchor of the present invention 10 which includes an anchor body 12 and a screw member 14. Anchor body 12 is preferably constructed of carbon steel or stainless steel. Screw member 14 is preferably constructed of carbon steel or stainless steel. It is understood that other suitable materials could be substituted to construct anchor body 12 and screw member 14. Anchor body 12 includes an integral adhesion segment 16 and friction segment 18. Anchor body 12 is designed to be inserted into a hole predrilled into a substrate such as concrete with adhesion section 16 inserted first such that the top portion 21 of friction segment 18 is flush with the surface of the substrate.

Screw member 14 includes flathead 24, spacer 25, and threaded portion 26. In the preferred embodiment, flathead 24 includes a plurality of indentions 28 (described below) for receiving a tool used for threading screw member 14 into anchor body 12 Indentations 28 may be of any desired configuration in order to mate the tool. For example, indentations 28 may be configured with a slot to receive a flathead screwdriver, or perpendicular slots for receiving a phillips head screwdriver, or any other desired configuration.

Adhesion segment 16 includes a plurality of saucer shaped buttons 32 with an outer diameter greater than the outer diameter of the shaft of the adhesion segment 34. Buttons 32 are rounded, or saucer shaped, such that when the anchor is inserted into a substrate hole containing adhesive, the rounded portion facilitates the flow of adhesive around buttons 32 so that the entire adhesion segment 16 is submerged in adhesive. Buttons 32 include a flat shelf facing friction segment 18. As anchor 10 is inserted into a substrate hole containing adhesive, the flat shelves of buttons 32 provide greater surface area such that when the adhesive cures, buttons 32 provide resistance against the adhesive to maintain anchor 10 within the substrate hole, thereby contributing to the holding values of anchor 10.

A terminal button 36 is shaped substantially the same as buttons 32 with the exception that its bottom surface is rounded, forming the terminal end of anchor 10. This rounded bottom surface of terminal button 36: 1.) Allows adhesive to flow freely around adhesion segment 16 as adhesion segment 16 is inserted into a substrate hole containing adhesive; and 2.) Helps prevent stress risers from occurring in the cured adhesive around terminal button 36.

The number of buttons placed on adhesion segment 142 depends on the length of the anchor. The length and diameter of the anchor is dependent upon the specific application and holding values required. The outer diameters of buttons 32 and terminal button 36 may be equal in size or may decrease in size (not shown) with terminal button 36 having the greatest diameter and the button closest to friction segment 18 having the smallest diameter.

Figures 7, 8:
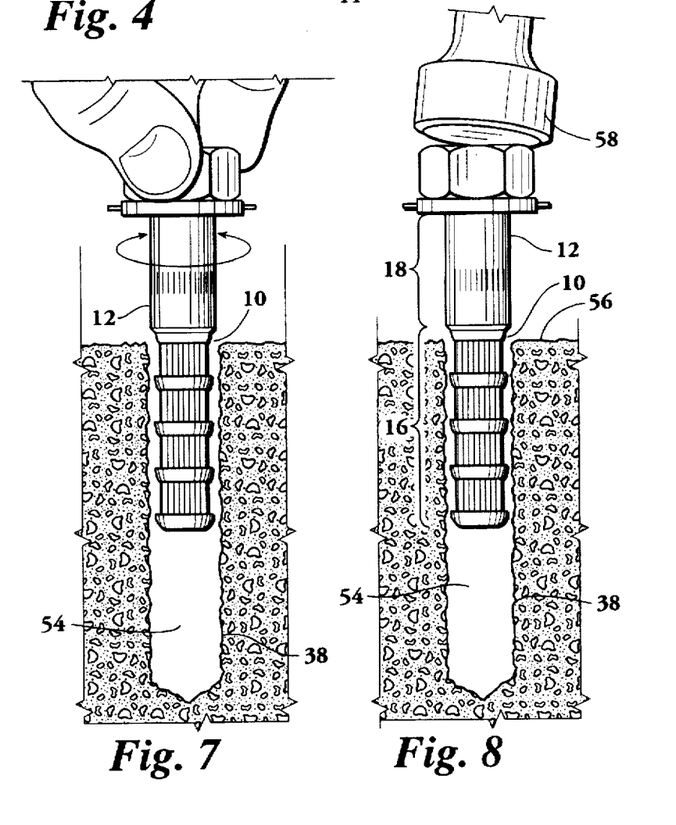
FIG. 7 is a cut-away partial side view of the hole of FIG. 6 wherein the adhesive insert anchor of the present invention is being twisted into the hole.
FIG. 8 is a cut-away partial side view of the hole of FIG. 7 wherein the adhesive insert anchor of the present invention is being driven into the hole.
Figure 9:
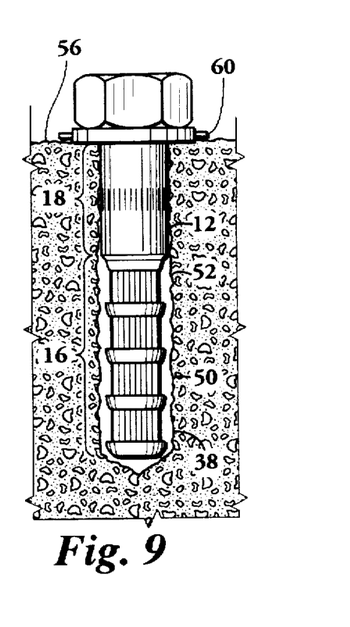
FIG. 9 is a cut-away side view of the hole of FIG. 8 with the adhesive insert anchor of the present invention fully installed.

Shaft 34 of adhesion segment 16 is knurled so as to increase the surface area of shaft 34. When adhesion segment 16 is inserted into a hole containing adhesive, the adhesive enters the crevices formed by the knurling and thereby forms a surface-to-surface bond between shaft 34 and the adhesive. These surface-to-surface bonds increase the holding value of anchor 10. The knurling could be in many suitable configurations. For example, the knurling shown in FIG. 1 is cross-hatched while the knurling shown in FIGS. 7–9 is vertical.

Figure 2:
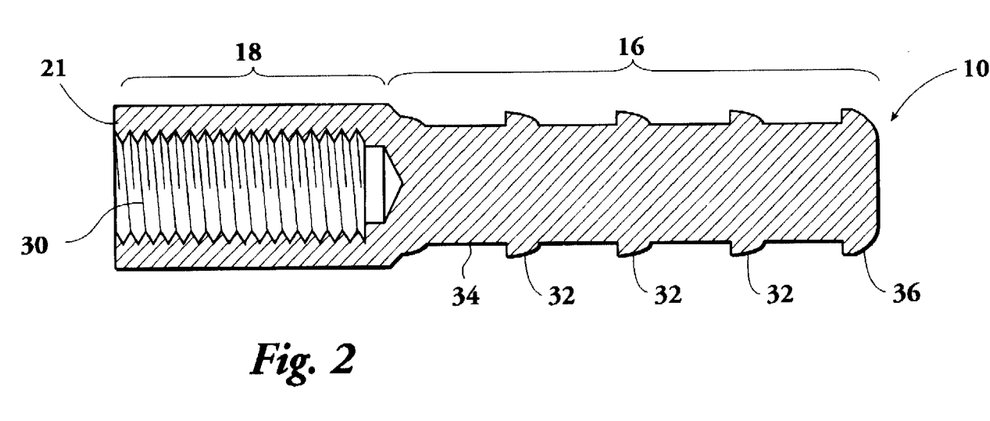
FIG. 2 is a longitudinal cross-section of the anchor of FIG. 1 taken along line 2—2 of FIG. 1.

As can be seen from FIG. 2, buttons 32 as well as terminal button 36 are formed integrally with shaft 34 and friction segment 18 so that anchor 10 is an integral unit containing cavity 30 therein.

Friction segment 18, FIG. 1, includes an internally threaded cavity 22 therein (shown in phantom) into which screw member 14 is threaded so that screw member 14 may anchor an object into anchor body 12 when anchor body 12 is fixed in a substrate. As can be seen in FIG. 2, a longitudinal cross-section of the anchor body of FIG. 1 taken along line 2—2 of FIG. 1, internally threaded cavity 22 is cut in friction segment 18 substantially the entire length of friction segment 18. The threads of internally threaded cavity 22 are cut to mate the threads of screw member 14 of FIG. 1 so that screw member 14 may be threaded inside internally threaded cavity 22. Screw member 14 can be threaded into internally threaded cavity 22 substantially the entire length of friction segment 18 of anchor body 12 in order to provide effective anchoring potential (holding values).

Referring again to FIG. 1, friction segment 18 is of a diameter substantially the same as the diameter of the hole drilled in the substrate so that when anchor body 12 is inserted into the hole drilled in the substrate, friction segment 18 will friction fit into the hole. The friction fit of friction segment 18 to the walls of the hole in the substrate allow anchor body 12 to be inserted and maintained at a depth in the hole in the substrate so that terminal button 36 of adhesion segment 16 is suspended a predetermined distance from the bottom of the hole drilled in the substrate.

Friction segment 18 includes a knurled segment 20 cut in its circumference. Knurled segment 20 as shown in FIG. 1 is cross hatched; however, it could be a series of parallel grooves cut in the circumference of friction segment 18 or any knurling pattern known in the industry. Knurled segment 20 adds to the frictional forces when anchor body 12 is inserted into the hole drilled in the substrate by scarring the walls of the hole. Additionally, knurled segment 20 resists rotation of anchor body 12 in the hole while screw member 14 is threaded into internally threaded cavity 22.

Adhesion segment 16 includes an irregular external diameter; however, the external diameter of adhesion segment 16 is smaller than the external diameter of friction segment 18, even at its points of greatest external diameter. Adhesion segment 16 does not contact the walls of the hole drilled in the substrate. A taper 52 reduces the external diameter of anchor body 12 from friction segment 18 to adhesion segment 16.

As is described above, adhesive insert anchor 10 provides independent coactive holding capabilities derived from: 1.) the friction fit of friction segment 18 and the substrate, and 2.) the cured adhesive bonding anchor 10 to the substrate. These coactive holding capabilities are found in all of the embodiments discussed herein.

Figure 4:
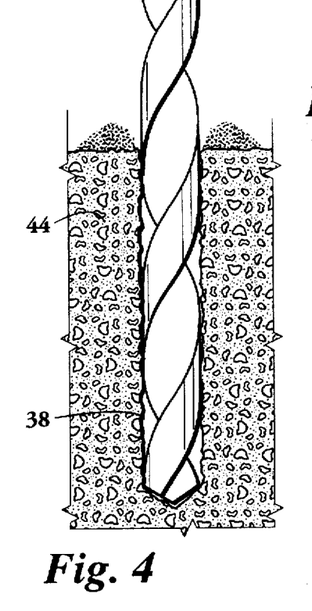
FIG. 4 is a cut-away side view of a hole being drilled in a substrate.
Figure 5:
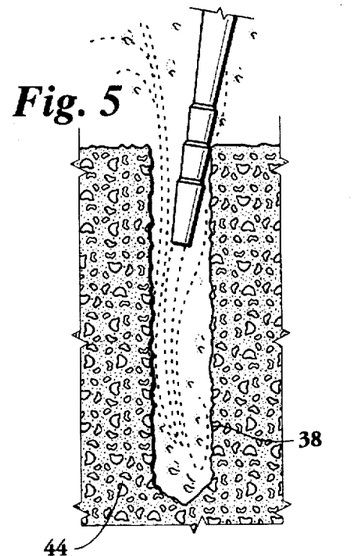
FIG. 5 is a cut-away side view of the hole of FIG. 4 being cleaned of debris.
Figure 6:
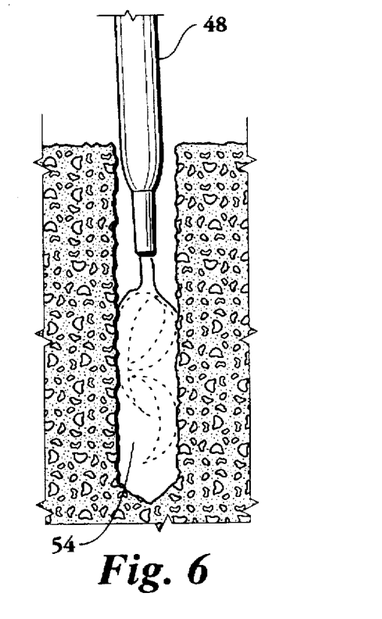
FIG. 6 is a cut-away side view of the cleaned hole of FIG. 5 wherein adhesive is being inserted using a static mixer.

Referring to FIG. 4, installation of the adhesive insert anchor begins with drilling a hole 38 in the substrate 44 to a predetermined depth. Substrate 44 may be any material, such as masonry or rock, but is most commonly concrete. The depth of hole 38 will be greater than the length of anchor body 12 to accommodate a generous amount of adhesive. Hole 38 is then cleaned, FIG. 5, with compressed air and a brush to remove any loose material in hole 38 as a result of drilling. This allows the adhesive to bond properly with the walls of hole 38. The presence of concrete dust resulting from drilling could affect the adhesion between the adhesive and walls of concrete hole 38. Concrete dust acts as a lubricant in the concrete hole, preventing the adhesive from entering the porosity of the concrete hole. After hole 38 is cleaned, an adhesive is added into hole 38, FIG. 6. Any adhesive suitable for the application can be used; however, an epoxy available from COVERT OPERATIONS® is highly suitable for this application. The epoxy is mixed with a small static mixing element 48 upon installation. The proper amount of adhesive should be added to hole 38 so that when anchor body 12 is inserted into hole 38, adhesive will fill the entire space 50, FIG. 9, between adhesion segment 16 and the walls of hole 38, all the way to the top of taper 52. This allows a strong bond between concrete 44 and anchor body 12.

Once the proper amount of adhesive 54 is added, anchor body 12, FIG. 7, is twisted into hole 38 to agitate adhesive 54. Twisting of anchor body 12 provides effective whetting of hole 38 by concrete dust on the walls of hole 38. This increases the ability of adhesive 54 to attack the porosity of the concrete, providing a better adhesive bond. Twisting of anchor 10 into hole 38 also functions to eliminate or minimize voids in adhesive 54 which may be present such as by air being trapped when the adhesive 54 inserted. Additionally, twisting anchor 10 agitates adhesive 54 in order to ensure thorough mixing such as when the adhesive is epoxy, a two-part mixture, generally of an epoxy and an activator. Anchor 10 is twisted into hole 38 until friction segment 18, FIG. 8, reaches the surface 56 of concrete 44. Then, anchor 10 is driven into hole 38 with a hammer 58 or similar instrument. Driving anchor 10 into hole 38 displaces adhesive 54 in hole 38 which fills the entire space 50 between adhesion segment 16 and hole 38.

It is known in the industry that when an adhesive such as epoxy is used, that the greater its cross-link density, the stronger the adhesive bond. It is also known that cross-link density can be increased by either an increase in cure temperature or an increase in cure pressure. When anchor 10 is driven into hole 38, adhesive segment 16 is forced into adhesive (epoxy) 54. A substantial amount of adhesive 54 is added to hole 38 such that once adhesive segment 16 is driven into it, adhesive 54 is placed under pressure. The friction fit between friction segment 18 and hole 38 maintains this pressurized state. The cross-link density of the epoxy is thereby increased. This pressurized state further forces adhesive 54 into the substrate, concrete 44 allowing it to attack the porosity of the concrete 44 as well as any voids which are frequently present. This results in a strong adhesive bond with anchor 10 as well as a strong bond between adhesive 54 and concrete 44.

Anchor body 12 is driven into hole 38 so that its upper surface 60 is flush with the surface 56 of concrete 44. The friction fit between friction segment 18 of anchor body 12 and the walls of concrete hole 38 maintains adhesion segment 16 a proper predetermined distance above the bottom of hole 38 so that a substantial amount of adhesive fills space 50. In addition to maintaining adhesion segment 16 the proper distance from the bottom of hole 38, the friction fit between friction segment 18 and the walls of hole 38 provides light-duty interim loading until the adhesive cures in space 50 around adhesive segment 16. This light-duty interim loading provides a time savings in that screw member 14 may be inserted through the object to be anchored (42) and threaded into internally threaded cavity 22 and thereby anchored by the friction fit of friction segments 18 with the walls of hole 38 while the adhesive around adhesive segment 16 is curing. Quick installation derived from this coactive holding capability is thereby provided. Knurled portion 20 (of FIG. 1) resists the rotation of anchor body 12 within hole 38 when screw member 14 is threaded into cavity 22 before the adhesive is cured.

A tight friction fit between friction segment 18 and the walls of hole 38 also prevents adhesive from being displaced around anchor body 12 so that it leaks around top surface 21 and into cavity 22. Such adhesive leaks are undesirable because they must be cleaned away, and it is undesirable for screw member 14 to be bonded or prevented from being entirely threaded by adhesive inside cavity 22.

Additionally, leakage prevention provided by the friction fit prevents the object being anchored from being adhesively bonded to concrete 44.

Depending on the thickness of the object to be anchored (42), a spacer 25 (FIG. 1) may be added to screw member 14 between flathead 24 and the concrete. Spacer 25 is an integral part of screw member 14.

The length and diameter of anchor body 12, and thereby the depth and diameter of hole 38, as well as the length and diameter of screw member 14 may be varied, depending upon the desired application, holding value required, and thickness of the object being anchored.

Figure 10:
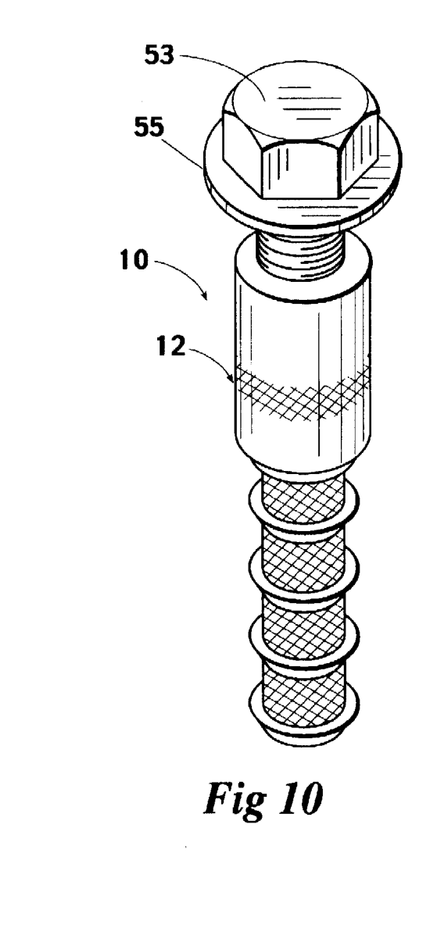
FIG. 10 is a side view of the adhesive insert anchor of the present invention configured with a bolt-in screw member and washer.

Screw member 14 of FIG. 1, which could be configured in a variety of difference ways or replaced with a variety of head portion configurations, may be integrated with anchor body 12, thereby eliminating internally threaded cavity 22. FIG. 10 depicts the adhesive insert anchor 10 wherein screw member 14 is replaced with a threaded bolt 53 and washer 55. Bolt 53 has threads mating the threads of internal threaded cavity 22 (not shown) so that bolt 53 may be threaded into the internal threaded cavity of anchor body 12.

Figure 11:
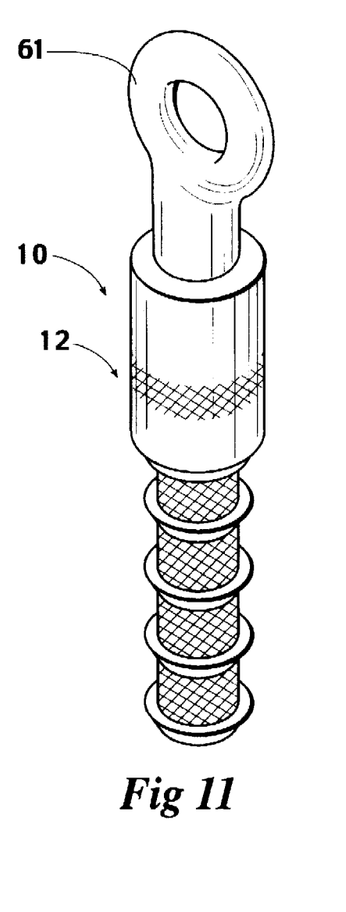
FIG. 11 is a side view of the adhesive insert anchor of the present invention configured with an eyelet fastener head portion.

FIG. 11 depicts adhesive insert anchor 10 wherein screw member 14 (FIG. 1) is replaced with an eyelet fastener 61. Eyelet fastener 61 may either include threads which mate the threads of internally threaded cavity 22 (not shown) so that eyelet fastener 61 can be threaded into anchor body 12, or eyelet fastener 61 may be an integral part of anchor body 12 and thereby fixed thereto (FIG. 11).

Figure 12:
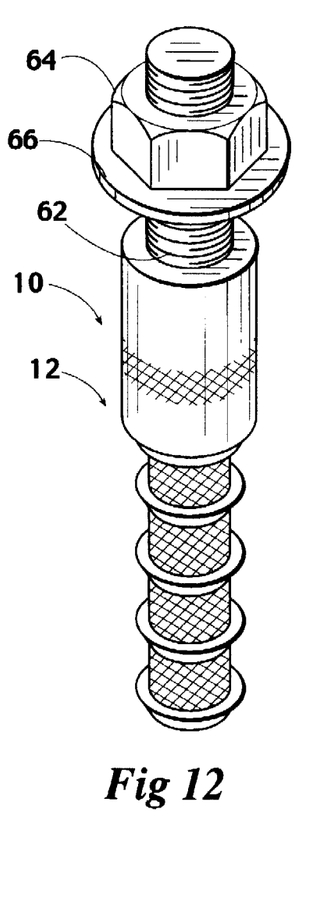
FIG. 12 is a side view of the adhesive insert anchor of the present invention configured with an integral male threaded rod, nut and washer.

FIG. 12 depicts adhesive insert anchor 10 wherein the screw member 14 and internally threaded cavity 22 (of FIG. 1) have been replaced with a male thread rod 62. Male thread rod 62 is an integral part fixed to anchor body 12 and extending upwardly therefrom. Male threaded rod 62 is threaded so as to receive a threaded nut 64 and washer 66.

Figure 13:
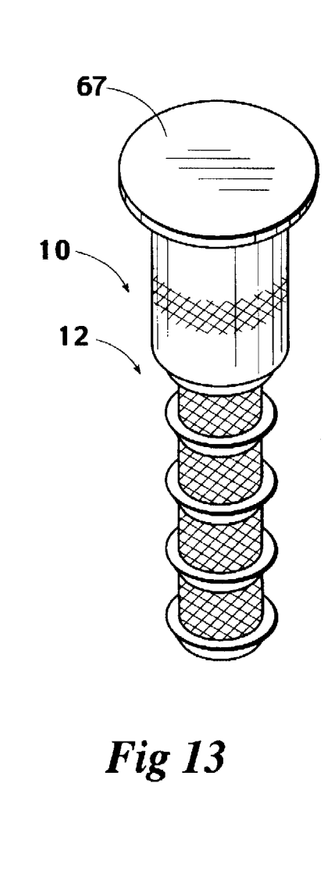
FIG. 13 is a side view of the adhesive insert anchor of the present invention configured with an integral hold-down portion.

FIG. 13 shows adhesive insert anchor 10 wherein screw member 14 and internally threaded cavity 22 (of FIG. 1) have been replaced by a permanent hold-down head portion 67. Permanent hold-down head portion 67 is an integral part of anchor body 12 and fixed thereto. The anchor of FIG. 13 would be used where it is desired to have an anchor with a large head portion surface area in which to permanently anchor an object.

The head portion configurations shown in FIGS. 4–7 are for exemplification purposes only, and are not all-inclusive. Adhesive insert anchor 10 could be configured with other head portions, such as a tamper-proof bolt, not depicted herein.

Figures 14, 15:
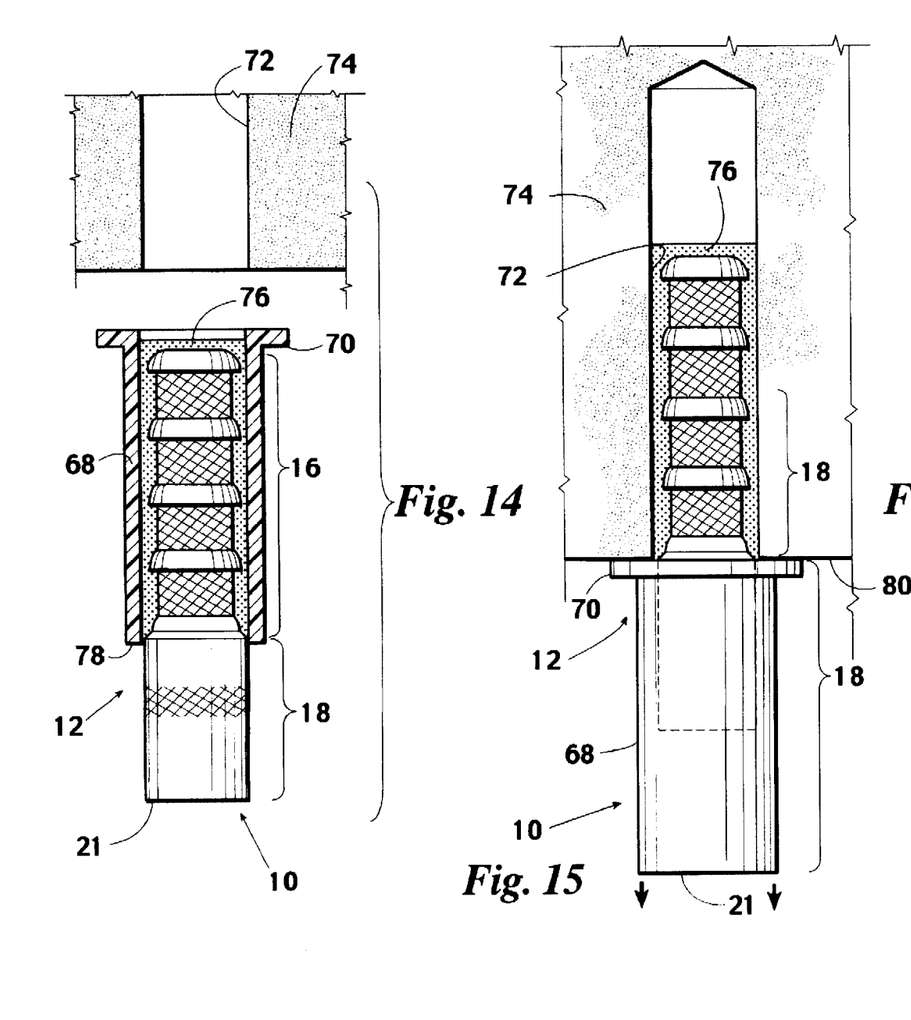
FIG. 14 is a side view of the adhesive insert anchor of the present invention including a sleeve and an adhesive for use in overhead applications.
FIG. 15 is a side view of the adhesive insert anchor of the present invention including a sleeve and an adhesive being inserted into a hole in a substrate in an overhead application.

Referring to FIG. 14, adhesive insert anchor 10 may be employed for wall or overhead applications. In an overhead application, anchor body 12 is fitted with a cylindrical sleeve 68. Sleeve 88 may be constructed of plastic or any other suitable material. Sleeve 88 is removably fitted on anchor body 12 so that it completely covers adhesion segment 16 and has an internal diameter which is substantially the same as the external diameter of friction segment 18 and removably fixes thereon. Sleeve 68 includes an annular flange 70 which is substantially larger than the diameter of friction segment 18.

Installation of adhesive insert anchor 10 in an overhead application is accomplished by drilling a hole 72 in substrate 74 to a predetermined depth. The depth of hole 72 is again greater than the length of anchor body 12 so as to accommodate a generous amount of adhesive. The diameter of hole 72 is substantially the same as the diameter of friction segment 18. The hole is then cleaned with compressed air and a nylon brush to remove any loose material in hole 72 as a result of drilling. This allows the adhesive to bond properly with the walls of hole 72. After hole 72 is properly cleaned, sleeve 68 is fixed on anchor body 12 so that adhesion segment 16 is completely covered. Sleeve 68 is then filled with an adhesive such as epoxy 76 to flange 70 so that adhesion segment 16 is completely immersed in epoxy. Adhesive anchor 10 is then located over hole 72, and anchor body 12 is twisted by gripping friction segment 18 and pushing adhesion segment 18 into hole 72 until friction segment 18 engages hole 72 (FIG. 15). Surface 21 is struck with a hammer or similar instrument until surface 21 is flush with surface 78 of sleeve 68. This configuration is shown in FIG. 15 wherein anchor body 12 has been twisted into hole 72 in substrate 74 so that adhesion segment 16 is completely inserted into hole 72. Since annular flange 70 is of a greater diameter than the diameter of hole 72, annular flange 70 prevents sleeve 68 from entering hole 72. Due to the fact that the internal diameter of sleeve 68 is substantially the same as the external diameter of friction segment 18, pushing friction segment 18 through sleeve 68 forces adhesive 76 into hole 72. Since the external diameter of friction segment 18 is substantially the same as the diameter of hole 72, as friction segment 18 extends into hole 72, it prevents adhesive 76 from leaking from hole 72 such as by gravity. Sleeve 68 is then pulled off of friction segment 18 and discarded. Anchor body 12 is then driven the rest of the way into hole 72 so that surface 20 is flush with the surface 80 of substrate 74.

Figure 16:
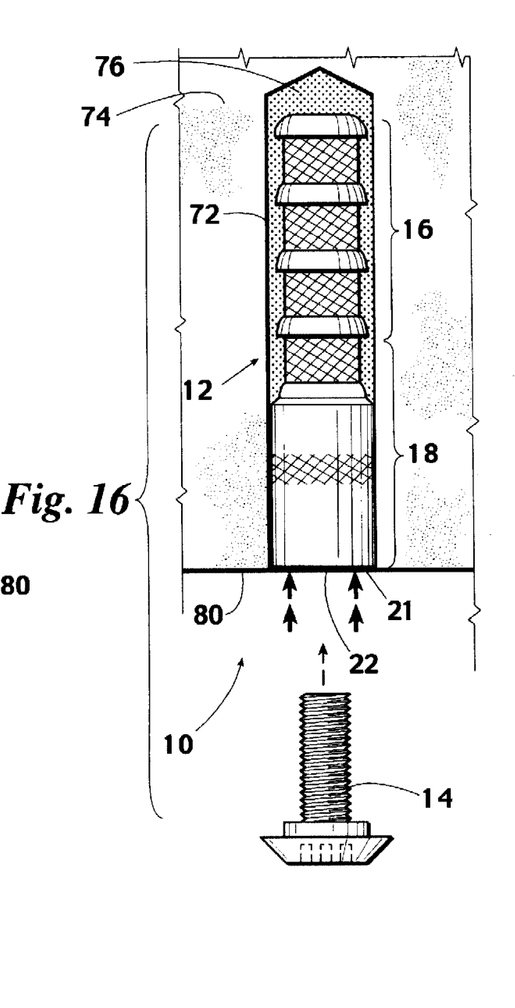
FIG. 16 is a side view of the adhesive insert anchor of the present invention including a sleeve and an adhesive fully inserted into a hole in a substrate in an overhead application.

FIG. 16 depicts anchor body 12 completely inserted into hole 72 in substrate 74 so that surface 21 is flush with surface 80 of substrate 74. When anchor body 12 is completely inserted, friction segment 18 pushes adhesive 76 to the end of hole 72 so that adhesive 76 completely surrounds adhesion segment 16, thereby providing a bond between adhesion segment t6 and substrate 74. Friction segment 18 prevents adhesive 76 from leaking out of hole 72 before curing. Friction segment 18 also provides light-duty interim loading of anchor 10 when screw member 14 is threaded into internally threaded cavity 22 (shown in phantom). Upon curing of epoxy 76, anchor body 12 is held in hole 72 both by epoxy 76 bonding adhesion segment 18 to substrate 74 and by friction segment 18 being friction fit with the walls of hole 72.

Figure 17:
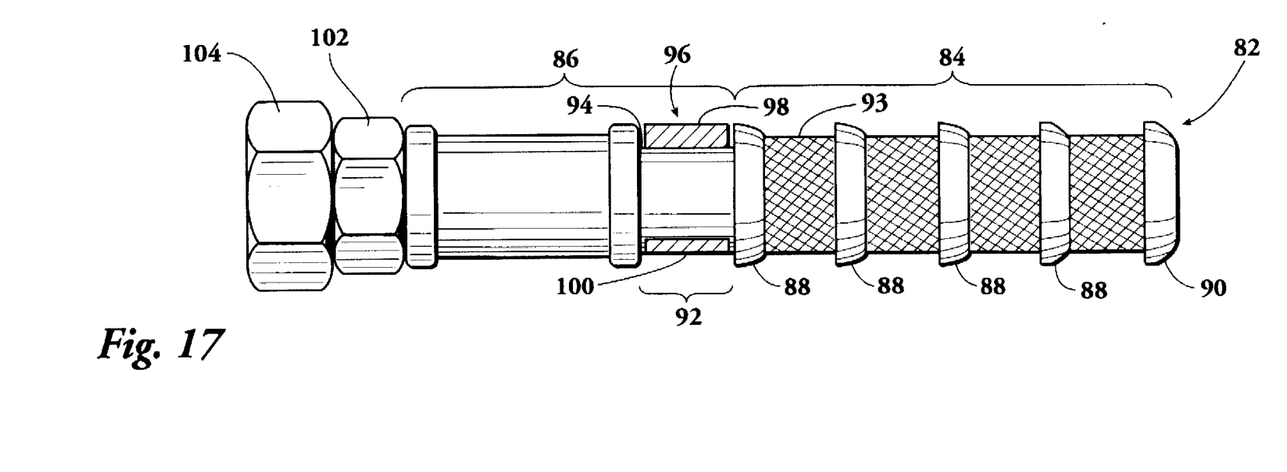
FIG. 17 is the adhesive insert anchor of FIG. 1 modified to include an eccentric wedge portion.

Referring to FIG. 17, the anchor of FIG. 1 could be modified to include an eccentric ring. Anchor 82 includes a plurality of buttons 88, a terminal button 90, and adhesion segment 84 substantially the same as adhesion segment 16 of anchor 10 (FIG. 1). Friction segment 86 of anchor 82 includes an eccentric portion 92. Eccentric portion 92 includes a cylindrical section 94 and an eccentric ring 96. The longitudinal axis of cylindrical section 94 is not the same as the longitudinal axis of shaft 93 of adhesion segment 84. Eccentric ring 96 is of a crescent shape in cross-section. FIG. 17 shows eccentric ring 96 partially cut away to illustrate its variable thickness. Middle (cut-away) 98 has a greater thickness than end 100 so that when anchor 82 is installed in a substrate hole and anchor 82 rotated by rotating nut 102, middle 98 of eccentric ring 96 extends beyond the outer diameter of friction segment 86 and engages the wall of the substrate hole, thereby wedging anchor 82 in the substrate hole. Once wedged, anchor 82 provides interim light-duty loading during cure of the adhesive and maintains adhesion segment 84 a predetermined distance from the bottom of the substrate hole. Bolt 104 is then threaded into the cavity in friction segment 86 to anchor an object. Nut 102 is a breakaway nut designed to break off at a predetermined torque such that sufficient torque can be maintained on anchor 82 to set eccentric portion 92 to wedge anchor 84 in the substrate hole. Nut 102 is then designed to break off once eccentric portion 92 is set. Bolt 104 is then used to anchor a member to anchor 82. Installation of anchor 82 is the same procedure as installation of anchor 10 as shown in FIGS. 4–9 above.

Figure 18:
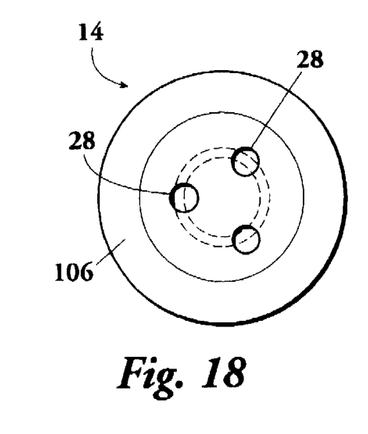
FIG. 18 is an end view of the bolt of FIG. 1 showing the tamper-proof sockets.

FIG. 18 depicts screw member 14 configured with a tamper-proof head 106. In certain applications it is necessary to install a screw member having a tamper-proof head in order to prevent unauthorized removal of the screw member and subsequently, the object being anchored. Screw member 14 includes a tamper-proof head 106 containing tamper-proof sockets 28. Tamper-proof sockets 28 are configured in such a manner to mate a setting tool (108 of FIG. 19). In order to install or remove tamper-proof screw member 14, one must have a setting tool 108 that mates screw member 14.

Figure 19:
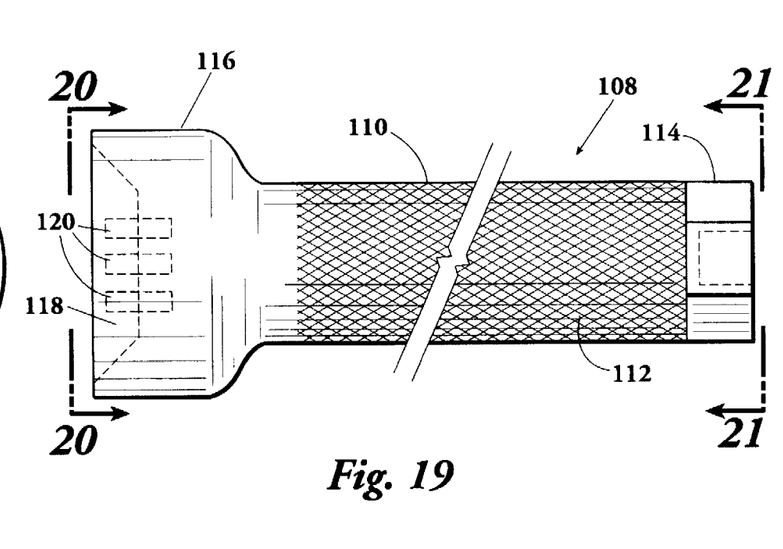
FIG. 19 is a side view of a setting tool for securing the bolt of FIG. 18 into the adhesive insert anchor of the present invention.

FIG. 19 shows setting tool 108 which includes a first end 118, shaft 110, and a second end 114. First end 116 has an indented portion t18 (shown in phantom). Indent 118 includes three prongs 120 which are press-fit into first end 116. Indent portion 118 and prongs 120 make tamper-proof head 106 and sockets 28 of screw member 14 (FIG. 18) so that when mated, setting tool 108 is used to thread, and remove, screw member 14 into/from anchor 10 (FIG. 1 ). Although tamper-proof head 106 and first end 116 of setting tool 108 are configured with three sockets 28 and three prongs 120 respectively, it is understood that the number and shape of mating sockets and prongs could vary substantially without departing from the spirit and scope of a tamper-proof arrangement.

Figure 20:
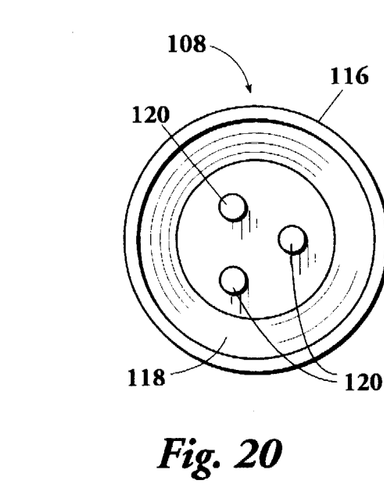
FIG. 20 is a first end view the setting tool of FIG. 19.

FIG. 20, a view taken along line 20—20 of FIG. 19, depicts first end 116 of setting tool 108. Prongs 120 are shown recessed in indent 118 to receive tamper-proof head 106 of screw member 14 which includes mating sockets 28. Prongs 120 are constructed of rolled steel and press-fit into first end, however, it is understood that pins would be a suitable alternative.

Referring back to FIG. 19, shaft 110 of setting tool 108 is of a length so as to be gripped by a person's hand. Shaft 110 includes knurling 112 thereon so as to facilitate a person's grip.

Figure 21:
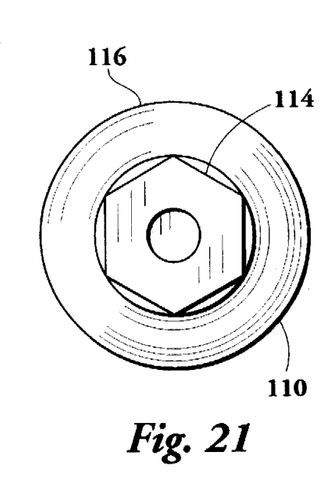
FIG. 21 is a second end view of the setting tool of FIG. 19.

Second end 114 of setting tool 108 includes an integral hex fitting to receive a socket, end, or crescent wrench so as to allow increased torque on setting tool 108 in order to thread or remove screw member 14. FIG. 21 is a view taken along line 21—21 of FIG. 20 shows second end 114 with integral hex fitting.

Figure 22:
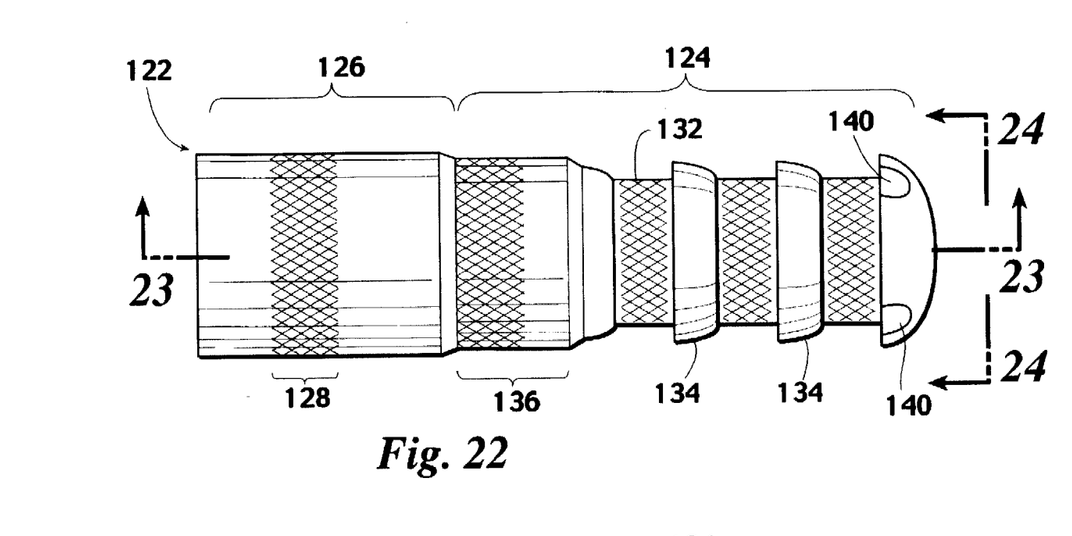
FIG. 22 is a second alternate embodiment adhesive insert anchor including a step on the adhesion segment and channels in the bottom button.

FIG. 22 depicts a second alternate embodiment adhesive insert anchor 122. Anchor 122 includes an adhesion segment 124 and a friction segment 126. As with the previous embodiments, friction segment 126 includes a knurled portion 128.

Figure 23:
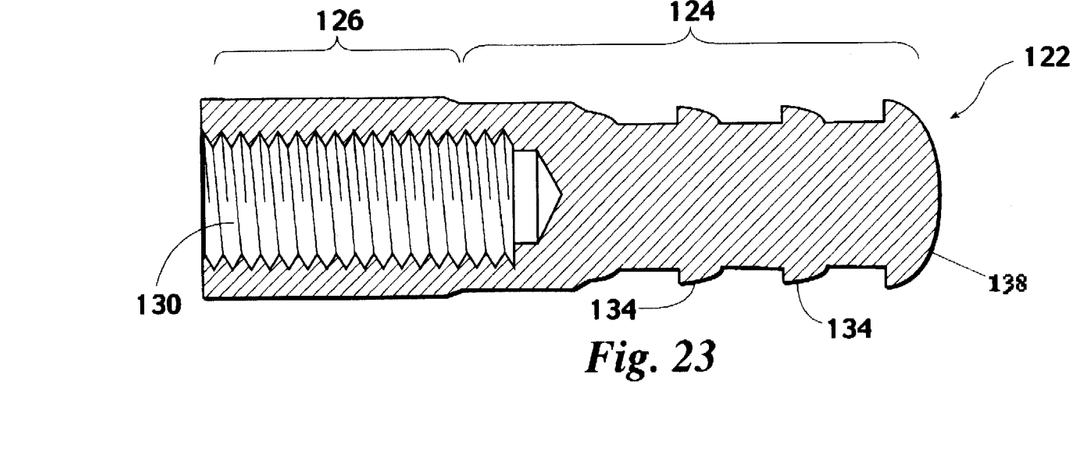
FIG. 23 is a longitudinal cross-section of the adhesive insert anchor of FIG. 22 taken along line 23—23 of FIG. 22.

FIG. 23, a longitudinal cross-section taken along line 23—23 of FIG. 22, shows anchor 122 containing an internal cavity 130 drilled within friction segment 126. Cavity 130 is threaded to receive a threaded bolt. Anchor 122 could also be configured to receive any of the head configurations depicted in FIGS. 10, 11, 12, 13, or other suitable configuration as required by the installation application.

Referring again to FIG. 22, adhesion segment 124 includes a plurality of saucer-shaped buttons 134 with an outer diameter greater than the outer diameter of the shaft 132 of the adhesion segment 124. Buttons 134 are rounded or saucer-shaped, such that when the anchor is inserted in the substrate hole containing adhesive, the rounded portion facilitates the flow of adhesive around buttons 194 so that the entire adhesion segment 124 is submerged in adhesive. Buttons 134 include a flat shelf which faces friction segment 126. As anchor 122 is inserted into a substrate hole containing adhesive, the flat shelves of buttons 134 provide greater surface area such that when the adhesive cures, buttons 134 provide resistance against the adhesive to maintain anchor 122 within the substrate hole, thereby contributing to the holding value of anchor 122.

Adhesion segment 124 of anchor 122 may include a step 136. The outer diameter of step 136 is greater than the outer diameter of shaft 132 but less than the outer diameter of friction segment 126.

The terminal button 138 of adhesion segment 124 is larger in diameter than buttons 134 so as to provide added surface area projecting outwardly from shaft 132 to be encompassed by and in contact with the adhesive. Terminal button 138 includes a plurality of channels, collectively 140 cut in its circumference. Channels 140 are cut in the circumference of terminal button 138 so as to facilitate and promote the movement of adhesive around terminal button 138 and upwardly onto shaft 132 and shelf 136 so as to completely encompass adhesion segment 124 when anchor 122 is inserted into a substrate hole containing adhesive.

Figure 24:
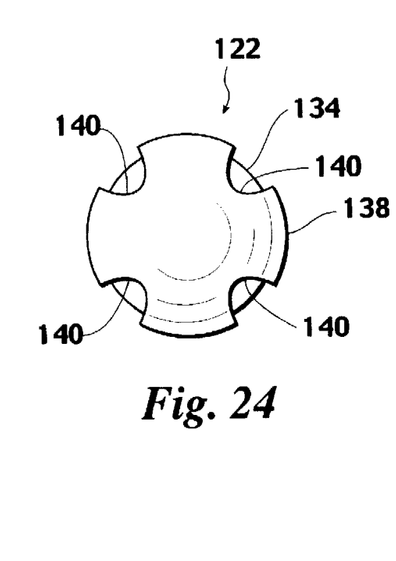
FIG. 24 is an end view of the adhesive insert anchor of FIG. 22 taken along line 24—24 of FIG. 22 illustrating the channels in the bottom button.

FIG. 24, an end view of anchor 122 taken along line 24—24 of FIG. 22, shows the manner in which channels 140 are cut in terminal button 138. FIG. 24 also shows the respective diameters of terminal button 138 and buttons 134. Anchor 122 is installed in substantially the same manner as anchor 10, described above.

Anchor 122 could also be modified with an eccentric portion on friction segment 126 in order to convert anchor 122 into an eccentric wedge adhesive anchor. Additionally, anchor 122 could be fitted with a sleeve and installed in overhead applications such as is shown and described in FIGS. 14, 14, and 16.

Figure 25:
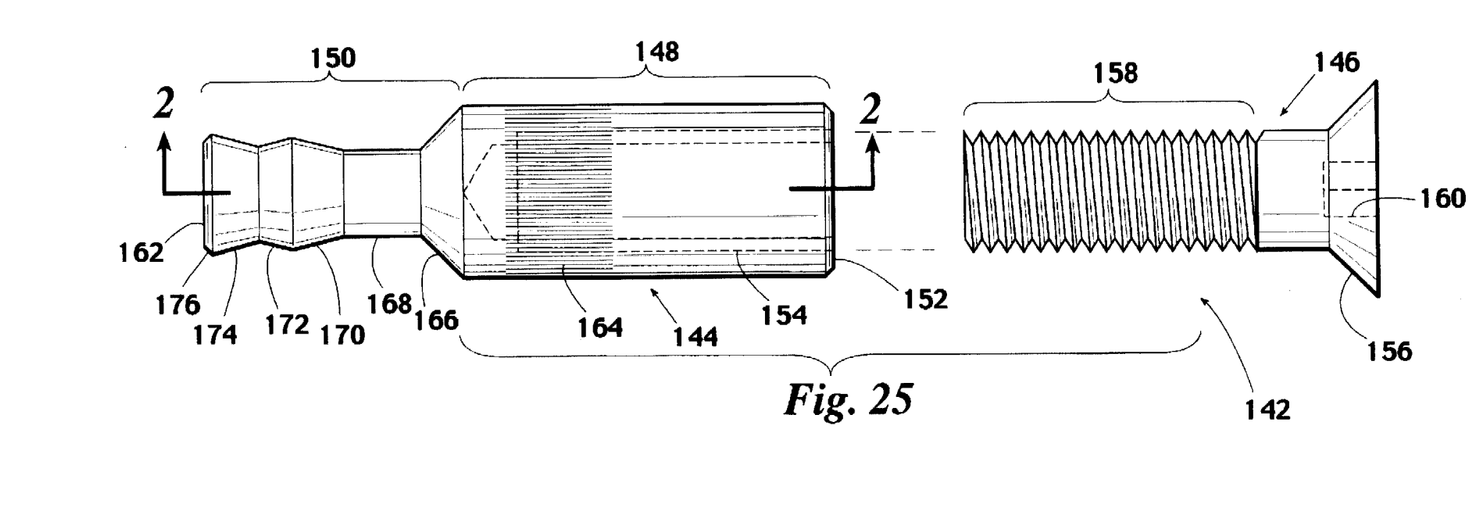
FIG. 25 is a side view of a third alternate embodiment of the adhesive insert anchor of FIG. 1 where the adhesion segment is modified to include a series of frustums.

FIG. 25 shows a third alternate embodiment adhesive insert anchor 142. Anchor 142 includes an adhesion segment 148 and a friction segment 150. Friction segment 150 contains a knurled portion 152 to score the inside of the substrate hole in order to increase the surface area in contact with the substrate hole to increase the frictional forces between the two surfaces. This increase in frictional forces provides increased holding values for anchor 142 against being pulled from the hole. It also provides resistance against rotational forces to keep the anchor from rotating in the hole as the anchor is placed under load.

Screw member 146 includes flathead 156, spacer 159, and threaded portion 158. Flathead 156 includes an indentation 160 for receiving a tool used for threading screw member 146 into anchor body 144. Indentation 160 may be of any desired configuration in order to make the tool. For example, indentation 160 may be configured with a slot to receive a flathead screwdriver, or perpendicular slots for receiving a phillips head screwdriver, or any other desired configuration.

Adhesion segment 150 is a solid member and includes in series a cylindrical section 168 and four frustums 170, 172, 174, and 176. The first two frustums 170 and 172 are positioned such that the first frustum 170 is positioned so that its truncated end is coupled with and of the same diameter as cylindrical section 168, and its base is coupled with and of the same diameter as the base of the second frustum 172. The second frustum 172 has its base in contact with the first frustum 170 and its truncated end coupled with and of the same diameter as the truncated end of the third frustum 174. The third frustum 174 is positioned with its truncated end connected to the second frustum 172 and its base coupled with and of the same diameter as the fourth frustum 176. The fourth frustum is positioned with its base coupled with the base of the third frustum 174 and its truncated end defining the terminal end 162 of adhesion segment 150 of anchor body 144. The fourth frustum 176 has a small length when compared to the first, second, and third frustum 170, 172, and 174. This small length frustum is designed to resist the occurrence of stress risers in the cured adhesive when anchor 142 is placed under a load.

Figure 26:
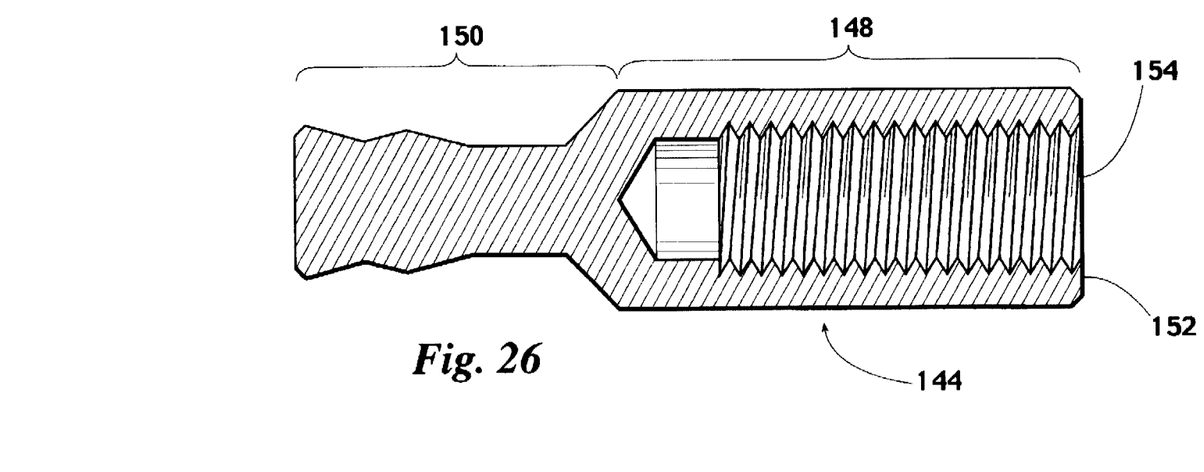
FIG. 26 is a longitudinal cross-section of the anchor body of FIG. 25 taken along line 26—26 of FIG. 25.
Figure 27:
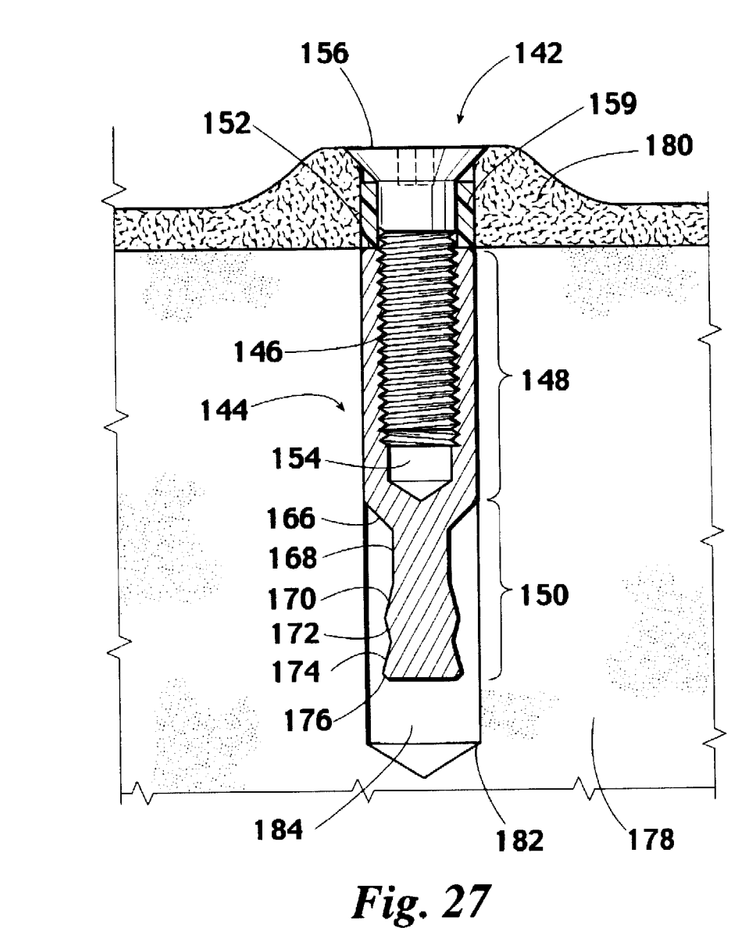
FIG. 27 is a longitudinal cross-section of the anchor body of FIG. 25 as installed in a substrate with a screw member threaded in the cavity of the friction segment thereby anchoring a tile to the substrate.

FIG. 26, a longitudinal cross-section taken along line 26—26 of FIG. 25 shows anchor 142 with internal cavity 160 drilled within friction segment 150. Cavity 180 is threaded to receive a threaded bolt, as shown in FIG. 27. Anchor 142 could also be configured to receive any of the head configurations depicted in FIGS. 10, 11, 12, 13, or other suitable configuration as is required by the installation application.

FIG. 27 is a longitudinal cross-section of anchor body 144 of FIG. 25 as installed in a substrate 178 with screw member 146 threaded in internally threaded cavity 154 of friction segment 148. Adhesive insert anchor 142 is shown anchoring tile 180 to substrate 178. As necessary, screw member 146 may be unscrewed from anchor body 144 such as for repair or replacement of tile 180 or for repair of concrete 178.

Figure 3:
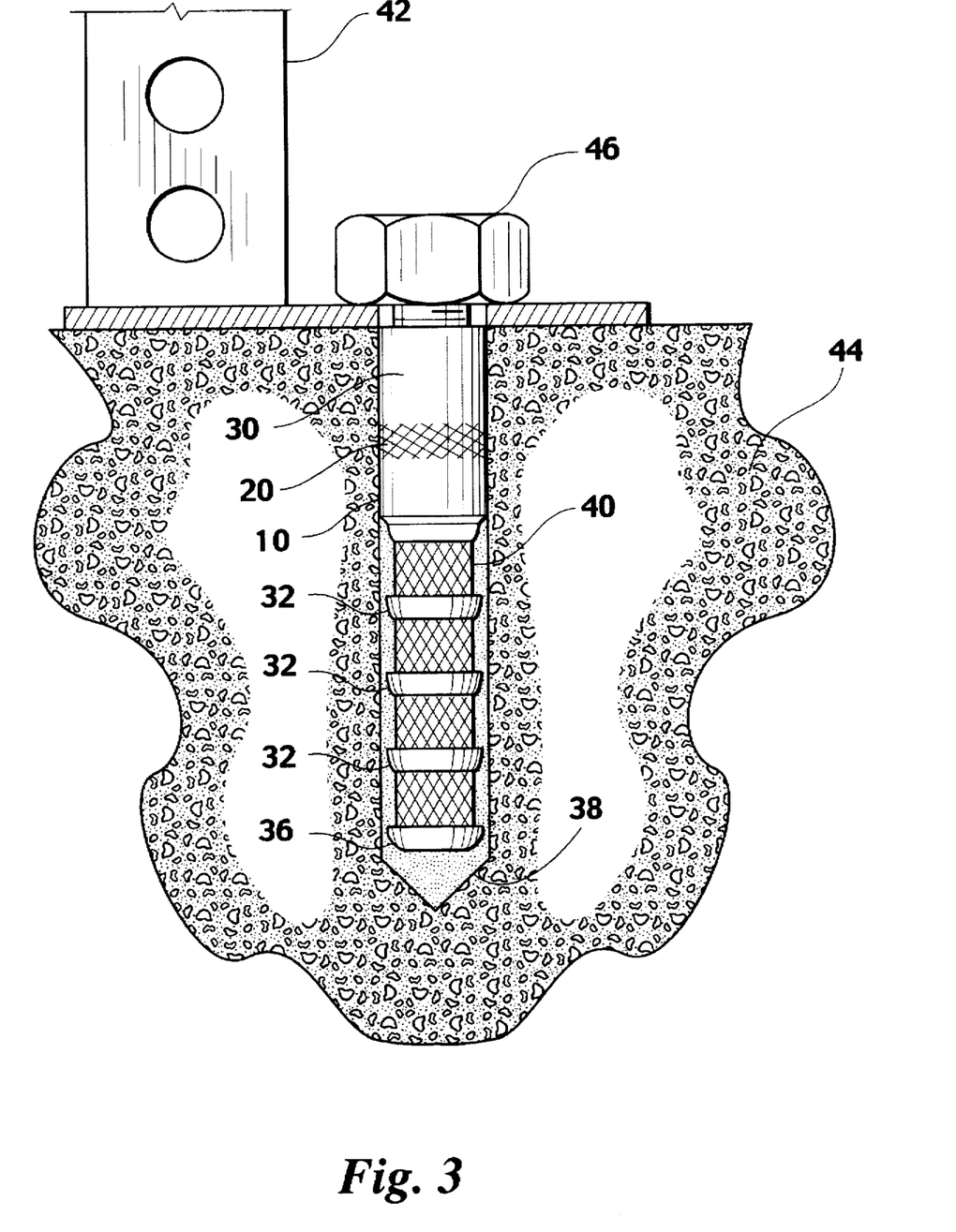
FIG. 3 is the anchor of FIG. 1 installed in a substrate with a bolt threaded in the cavity of the friction segment thereby anchoring a member to the substrate.

Installation of anchor 142 is substantially the same as installation of anchor 10 of FIG. 3 described above (FIGS. 4-9) and begins with drilling hole 184 in substrate 178 to a predetermined depth. The depth of hole 184 is greater than the length of anchor 142 to accommodate a generous amount of adhesive. Hole 184 is then cleaned with compressed air and a brush to remove any loose material in hole 182 as a result of drilling. After hole 182 is cleaned, adhesive is added to hole 182. The proper amount of adhesive should be added to hole 182 so that when anchor body 142 is inserted into hole 182, the adhesive, or epoxy, fills the entire space 184 between the adhesion segment of anchor 142 and the walls of hole 184.

Once the proper amount of adhesive is added, anchor 142 is twisted into hole 182 so that the adhesive within hole 182 is agitated and displaced until friction segment 148 enters hole 182. Anchor body 144 is then driven into hole 182 so that its top surface 152 is flush with the surface of substrate 178. Adhesive fills the entire space between adhesion segment 150 of anchor 142 and hole 182. Anchor 142 is driven in the hole so that the upper surface of friction segment 148 is flush with the surface of substrate 178. The friction fit between friction segment 148 of anchor 142 and the walls of the substrate hole 182 maintain adhesion segment 150 a predetermined distance above the bottom of hole 182. Additionally, the friction fit provides light-duty interim loading until the adhesive cures around the adhesion segment 148.

Depending on the thickness of the object to be anchored (tile 180), a spacer 159 (also in FIG. 25) may be added to screw member 14 between flathead 156 and concrete 178. Spacer 159 allows screw member 146 to be tightened against it instead of against tile 180 which may otherwise damage or distort tile 180. Spacer 159 may be constructed of any suitable material such as plastic, metal, or rubber. The length and diameter of anchor body 144, and thereby the depth of hole 182, as well as the length and diameter of screw member 156 may be varied, depending upon the desired application, holding valve required, and thickness of the object being anchored.

After anchor 142 is installed in hole 182, tile 180 may be placed over hole 182, a screw 146 placed through tile 180 and threaded into the internal cavity 154 of anchor 142. Tile 180 is now anchored to substrate 178. Screw 146 can be threaded into cavity 154 while adhesive is curing around adhesion segment 150 of anchor 142 due to the interim loading capability of anchor 142. The knurled portion of friction segment 148 resists rotation of anchor 142 while screw 146 is tightened in cavity 154. Quick installation due to its coactive holding capability is thereby provided by anchor 142.

Anchor 142 of FIG. 27 could also be modified for overhead applications through the addition of a sleeve (not shown) around adhesion segment 150. Installation of anchor 142 in overhead applications would be substantially the same as shown in FIGS. 14, 15, and 16, and the description relating thereto. The sleeve would be modified from that shown in FIGS. 14, 15, and 16, however, to accommodate for the length of adhesion segment 150 of anchor 142.

Figure 28:
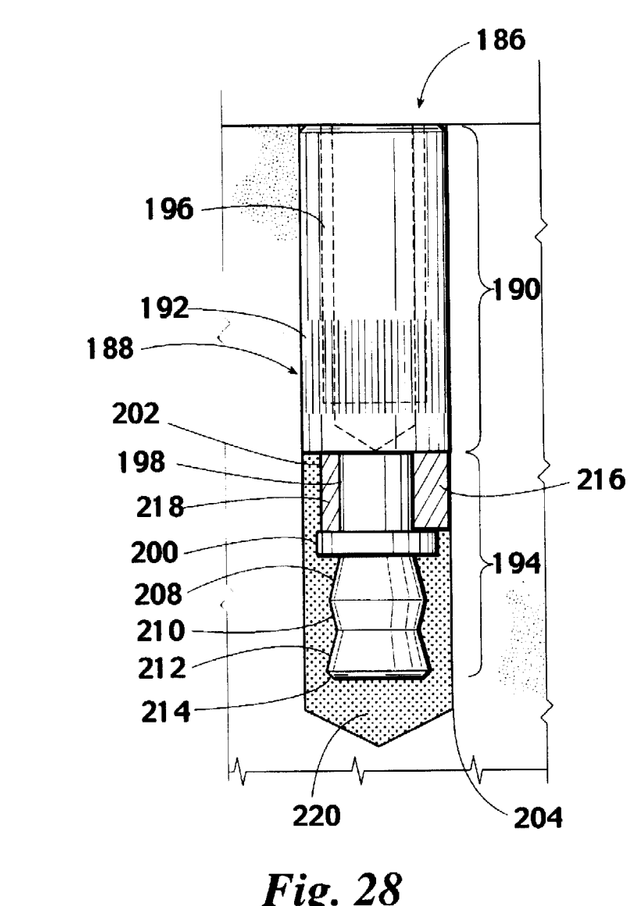
FIG. 28 is a side view of an alternate embodiment of the adhesive insert anchor of FIG. 25 where the adhesion segment is modified to include an eccentric wedge.

FIG. 28 is a fourth alternate embodiment of the adhesive insert anchor of the present invention. Anchor 186 is substantially the same as anchor 142 of FIG. 25 with the exception of the addition of an eccentric ring or wedge 202. Friction segment 190 of anchor 186 is substantially the same as friction segment 148 of anchor 142 of FIG. 25, including a knurled portion 192 and an internally threaded cavity 196 (shown in phantom) for receiving a threaded screw member such as screw member 146 of FIG. 25. Friction segment 190 frictionally engages the walls of hole 204 of substrate 206. Adhesion segment 194, however, is modified to include an eccentric ring or wedge 202. Cylindrical section 198 of adhesion segment 194 has been modified on anchor 186 so that the longitudinal axis of cylindrical section 198 is not the same as longitudinal axis of anchor body 188. An integral annular ring 200 has been added to adhesion segment 194 to provide a slot for receiving an eccentric ring or wedge 202 on cylindrical section 198. Eccentric ring 202 is of a crescent shape in vertical cross-section. Eccentric ring 202 is shown cut-away in FIG. 28 to illustrate its varying thickness. Middle 216 (shown cut-away) has a greater thickness than end 218. Adhesion segment 194 of anchor 186 includes four frustums 208, 210, 212, and 214 just as anchor 142 of FIG. 25.

Upon installation of anchor 186, hole 204 is drilled in substrate 206. Hole 204 is then cleaned with compressed air and a brush to remove particles and residue left from the drilling of hole 204. A generous amount of adhesive 220 is then inserted into hole 204. Anchor body 188 is twisted into hole 204 to agitate adhesive 218. Twisting anchor body 188 provides effective whetting of hole 204 by disrupting concrete dust on the walls of hole 204. This increases the ability of adhesive 220 to attack the porosity of substrate 206. Anchor 186 is twisted into hole 204 until friction segment 190 enters hole 204. Anchor body 188 is then driven into hole 204 so that adhesion segment 194 displaces adhesive 220 completely surrounding adhesion segment 194. A threaded member is then threaded entirely into cavity 196, rotational force is exerted so that the frictional forces between friction segment 190 and the walls of hole 204 are overcome, and anchor body 188 is rotated within hole 204 so that eccentric ring 262 contacts wall 204 and thereby wedges or cams against the walls of hole 204. Eccentric ring 202 must be set prior to the curing of adhesive 218; otherwise, adhesive 220 will prevent anchor body 188 from rotating. Once eccentric ring 202 is set and adhesive 120 is cured, substantial holding values are provided by the friction fit of friction segment 190 against the walls of hole 204, the wedging forces produced by the camming action of eccentric ring 202 against the walls of hole 204, and the bond produced by adhesive 220 between adhesion segment 194 and substrate 206.

Figure 29:
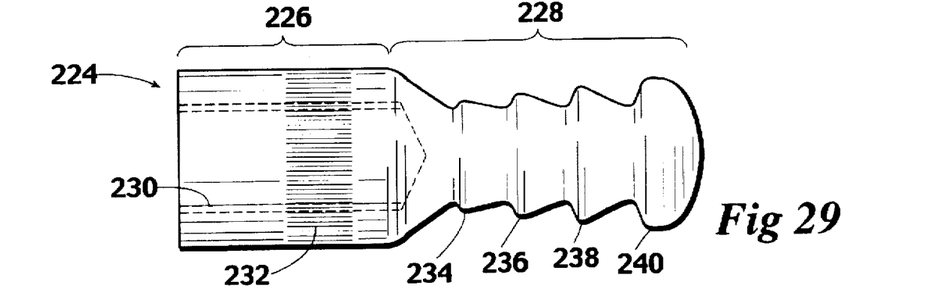
FIG. 29 is a side view of an alternate embodiment of the adhesive insert anchor of the present invention where the adhesion segment is modified to include annular rounded ridges.

FIG. 29 shows a fifth alternate embodiment of the adhesive insert anchor of the present invention wherein the adhesion segment has been modified. Anchor body 224 includes friction segment 226 and adhesion segment 228. Friction segment 226 is the same as friction segment 148 of FIG. 25, including internally threaded cavity 230 (shown in phantom) and knurled portion 232.

Figure 30:
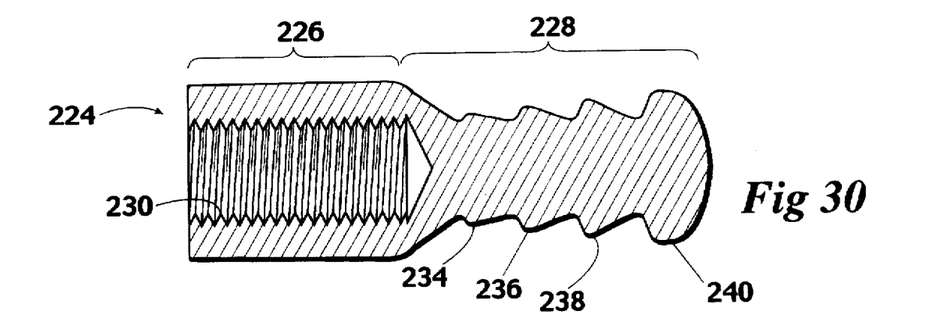
FIG. 30 is a longitudinal cross-section of the alternate embodiment of FIG. 29.

FIG. 30, a longitudinal cross-section of anchor body 224 of FIG. 29, shows internally threaded cavity 230 within frictional segment 226.

Referring back to FIG. 29, adhesion segment 228 of anchor body 224 includes a series of annular rounded ridges 234, 236, 238, and a rounded terminal end 240. It is understood that anchor body 224 could include a greater or fewer number of annular rounded ridges than those shown in FIG. 29. The diameters of the annular rounded ridges increase as they approach rounded terminal end 240. For example, the diameter of annular rounded ridge 236 is greater than the diameter of annular rounded ridge 234. Likewise, the diameter of annular raised ridge 238 is greater than the diameter of annular rounded ridge 236. Finally, the diameter of rounded terminal end 240 is greater than the diameter of annular rounded ridge 238. The increasing diameters facilitate the movement of adhesive along adhesion segment 228 when anchor body 224 is inserted into a hole filled with adhesive.

For example, an anchor may be constructed wherein:
Diameter of annular ridge 234 is 0.605",
Diameter of annular rounded ridge 236 is 0.680"
Diameter of annular rounded ridge 238 is 0.710"
Diameter of rounded terminal end 240 is 0.750"

Figure 31:
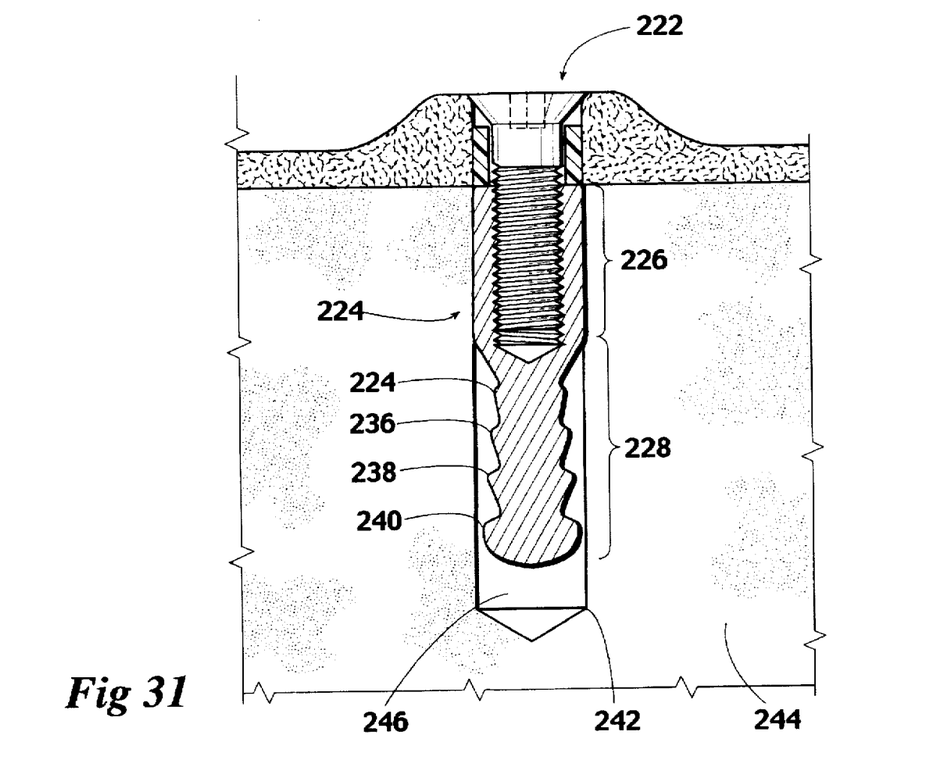
FIG. 31 is a cut-away view of the alternate embodiment of FIG. 29 installed in a hole drilled in a substrate.

Referring to FIG. 31, hole 242 has been drilled in substrate 244, and a generous amount of adhesive has been placed in space 246 of hole 242. Referring to FIG. 31, installation of the fifth alternate embodiment adhesive insert anchor 222 is the same as the installation procedure for the installation of adhesive insert anchor 142 having the preferred embodiment as described in relation to FIG. 27. When anchor body 224 is driven into hole 242 so that adhesion segment 228 displaces the adhesive in space 246, adhesive can easily fill the entire space between adhesion segment 228 and the walls of hole 242 in order to provide a proper bond upon curing of the adhesive. Annular rounded ridges 234, 236, and 238, as well as rounded terminal end 240, are rounded so as to resist the appearance of stress risers in the adhesive after it cures, while still providing substantial surface area to increase holding values.

While the invention has been described with a certain degree of particularity, it is manifest that many changes may be made in the details of construction without departing from the spirit and scope of this disclosure. It is understood that the invention is not limited to the embodiment set forth herein for purposes of exemplification, but is to be limited only by the scope of the attached-claim or claims, including the full range of equivalency to which each element thereof is entitled.

What is claimed is:

1. An adhesive insert anchor for retaining an object against a substrate, said adhesive insert anchor being inserted within a hole defined in said substrate, said hole having a bottom and a diameter, comprising:

an anchor body including a friction segment having an outer diameter and an adhesion segment having an outer diameter wherein the outer diameter of said friction segment is greater than said outer diameter of said adhesion segment;

said outer diameter of said friction segment being substantially the same as the diameter of the hole so that when said adhesive insert anchor is inserted within the hole, said friction segment friction fits against the substrate thereby securing said anchor body in the hole and suspending said adhesion segment at a predetermined distance above the bottom of the hole.

2. The adhesion insert anchor of claim 1 wherein adhesive is placed in the hole prior to inserting said adhesive insert anchor such that said adhesive segment is immersed in the adhesive which bonds said adhesive segment to the substrate once cured.

3. The adhesive insert anchor of claim 2 wherein said friction segment prevents the adhesive from being displaced from the hole when said adhesive insert anchor is inserted.

4. The adhesive insert anchor of claim 1 wherein said friction segment includes an internally threaded cavity extending substantially through its entire length.

5. The adhesive insert anchor of claim 4 further including a screw having threads which mate the threads of said internally threaded cavity.

6. The adhesive insert anchor of claim 1 wherein said adhesive segment includes:

a shaft;

at least one button positioned on said shaft.

7. The adhesive insert anchor of claim 6 wherein said anchor body includes a terminal end formed by a terminal button on said adhesion segment.

8. The adhesive insert anchor of claim 7 wherein each said button is formed integrally with said shaft and saucer shaped defined by a rounded portion facing said terminal button and a flat shelf facing said friction segment.

9. The adhesive insert anchor of claim 7 wherein said adhesive segment further includes an eccentric portion positioned on said shaft, further comprising:

a cylindrical portion having a longitudinal axis which is different from the longitudinal axis of said shaft;

an eccentric ring secured on said cylindrical portion.

10. The adhesive insert anchor of claim 8 wherein said adhesion segment includes a step between said friction segment and said shaft.

11. The adhesive insert anchor of claim 8 wherein said terminal button includes at least one channel cut therein.

12. The adhesion insert anchor of claim 1 wherein said adhesive segment includes:

a first end and a terminal end;

a taper coupled to said friction segment and defining said first end of said adhesion segment;

a cylindrical section coupled to said taper;

a first, second, third, and fourth frustum each including a base and a truncated end;

the truncated end of the first frustum coupled to said cylindrical section;

the base of said first frustum coupled to the base of said second frustum;

the truncated end of said second frustum coupled to the truncated end of said third frustum;

the base of said third frustum coupled to the base of said fourth frustum;

the truncated end of said fourth frustum defining the terminal end of said adhesion section.

13. An adhesive insert anchor, comprising:

an anchor body including an adhesion segment and a friction segment wherein said adhesion segment is adjacent said friction segment;

said adhesion segment including a rounded terminal end and a longitudinal shaft with a plurality of buttons positioned along its length;

said shaft having an outer diameter and said buttons each having an outer diameter wherein the outer diameter of each button is greater than the outer diameter of said shaft;

said friction segment having an outer diameter;

said outer diameter of said friction segment being greater than said outer diameter of each of said buttons.

14. The adhesive insert anchor of claim 13 wherein said friction segment includes an internally threaded cavity extending substantially the entire length of said friction segment from one end thereof.

15. The adhesive insert anchor of claim 14 further including a screw threaded into said internally threaded cavity wherein said screw having threads mating the threads of said internally threaded cavity.

16. The adhesive insert anchor of claim 13 wherein said terminal end is formed by a terminal button on said adhesion segment.

17. The adhesive insert anchor of claim 16 wherein each said button is formed integrally with said shaft and is saucer shaped defined by a rounded portion facing said terminal button and a flat shelf facing said friction segment.

18. The adhesive insert anchor of claim 13 wherein said friction segment contains knurling thereon.

19. The adhesive insert anchor of claim 13 wherein said shaft is knurled along its length between each said button.

20. An adhesive insert anchor for retaining an object against a substrate, said adhesive insert anchor being inserted within a hole defined in said substrate, said hole having a diameter, comprising:

an anchor body including a friction segment having an outer diameter and an adhesion segment having an outer diameter wherein the outer diameter of said friction segment is greater than said outer diameter of said adhesion segment;

said anchor body being a solid mass of material;

said outer diameter of said friction segment being substantially the same as the diameter of the hole so that when said anchor body is inserted within the hole, said friction segment friction fits against the substrate thereby securing said anchor body in the hole.

21. The adhesive insert anchor of claim 20 wherein said friction segment includes an internally threaded cavity extending substantially the entire length of said friction segment from one end thereof.

22. The adhesive insert anchor of claim 21 further including a screw threaded into said internally threaded cavity wherein said screw having threads mating the threads of said internally threaded cavity.

23. The adhesive insert anchor of claim 20 wherein said adhesion segment includes:

a shaft;

at least one button positioned on said shaft.

24. The adhesive insert anchor of claim 23 wherein said anchor body includes a rounded terminal end formed by a terminal button on said adhesion segment.

* * * * *